US012704523B2

(12) United States Patent
Wennekamp et al.

(10) Patent No.: US 12,704,523 B2
(45) Date of Patent: Aug. 11, 2026

(54) METHOD FOR DETECTING A MALFUNCTION OF A MONITORING SYSTEM

(71) Applicant: Siemens Mobility GmbH, Munich (DE)

(72) Inventors: Fabian Wennekamp, Essen (DE); Markus Knoll, Mühlhausen (DE); Robert Mertens, Meerbusch (DE)

(73) Assignee: Siemens Mobility GmbH, Munich (DE)

( * ) Notice: Subject to any disclaimer, the term of this patent is extended or adjusted under 35 U.S.C. 154(b) by 322 days.

(21) Appl. No.: 18/547,551

(22) PCT Filed: Jan. 25, 2022

(86) PCT No.: PCT/EP2022/051524
§ 371 (c)(1),
(2) Date: Aug. 23, 2023

(87) PCT Pub. No.: WO2022/179781
PCT Pub. Date: Sep. 1, 2022

(65) Prior Publication Data

US 2024/0133917 A1 Apr. 25, 2024
US 2024/0230708 A9 Jul. 11, 2024

(30) Foreign Application Priority Data

Feb. 23, 2021 (DE) .................... 10 2021 201 672.3

(51) Int. Cl.
*B61L 15/00* (2006.01)
*G01P 21/00* (2006.01)

(52) U.S. Cl.
CPC .......... *G01P 21/00* (2013.01); *B61L 15/0081* (2013.01)

(58) Field of Classification Search
CPC ..... G01P 21/00; B61L 15/0081; B61L 25/021
USPC ........ 73/1.37, 1.38, 865.8, 865.9; 340/425.5, 340/438, 441, 653, 669, 670
See application file for complete search history.

(56) References Cited

U.S. PATENT DOCUMENTS

2019/0041425 A1 2/2019 Kitzmueller et al.

FOREIGN PATENT DOCUMENTS

| | | | | |
|---|---|---|---|---|
| DE | 102006047521 A1 | 4/2008 | | |
| DE | 102015218941 A1 * | 3/2017 | ............. | G01P 21/00 |
| EP | 2166365 A1 | 3/2010 | | |
| WO | 2015100425 A1 | 7/2015 | | |

* cited by examiner

*Primary Examiner* — Robert R Raevis
(74) *Attorney, Agent, or Firm* — Laurence A. Greenberg; Werner H. Stemer; Ralph E. Locher

(57) ABSTRACT

A method for detecting a malfunction of a monitoring system which is used for monitoring the running stability of a rail vehicle during operation of the rail vehicle in a monitoring operating range, includes using an acceleration sensor of the monitoring system to generate a signal during operation of the rail vehicle. In a test using a variable that depends on the signal, it is tested whether the monitoring system has the malfunction. In order to improve the running stability monitoring, the test is carried out during operation of the rail vehicle in an operating range in which the monitoring system does not carry out any running stability monitoring. A device for carrying out the method, a rail vehicle, a computer program and a machine-readable storage medium, are also provided.

14 Claims, 2 Drawing Sheets

2

22

1

Test Facility

4

Monitoring System

5

8

High-Pass Filter

14

Band Pass Filter

16

Acceleration Sensor

6

10

12

Speed Measuring Device

METHOD FOR DETECTING A MALFUNCTION OF A MONITORING SYSTEM

FIELD AND BACKGROUND OF THE INVENTION

The invention relates to a method for detecting a malfunction or a misoperation or a defect of a monitoring system, which is used to monitor the running stability of a rail vehicle during operation of the rail vehicle in a monitoring operating range.

Methods for detecting errors or malfunctions in a monitoring system are generally known. For example, the detection of a defect in an acceleration sensor, which is part of the monitoring system and is used to monitor running stability, is known.

Acceleration sensors are used in many technical areas. For example, an acceleration sensor can be used in a vehicle to increase the safety of the vehicle. The transverse acceleration of the vehicle can be measured by means of the acceleration sensor and a warning can be given of high acceleration values, for example. to ensure the safety of the occupants of the vehicle and/or in the case of a rail vehicle to prevent damage to the track.

In a rail vehicle, for example, the acceleration sensor can be used to measure the transverse acceleration of the rail vehicle or of an individual car, in particular in order to monitor what is known as the sine run of the rail vehicle. The sine run of a rail vehicle, also known as wave run, can be understood as an oscillation of the rail vehicle around its ideal driving line. This oscillation can be caused by (approximately) conical, outwardly tapering wheels rigidly coupled via an axle and its presence is particularly marked at high speeds of the rail vehicle. If the wheels are off-center on two parallel rails, the wheel that is offset to the outside rolls with a larger circumference, causing the axle to steer in. The wheelset of the rail vehicle or car experiences a transverse acceleration. High transverse acceleration causes high forces in the wheelset-rail contact, which can lead to track damage or loss of tracking.

However, an acceleration sensor can have a malfunction or a misoperation or a defect that leads to a malfunction of the monitoring system, for example, due to a broken wire or a short circuit within the sensor or in the measurement chain. The acceleration sensor may then deliver faulty signals. The faulty signals can, for example, lead to a false alarm, i.e. to a warning being given although no critical situation exists. Faulty signals can also lead to critical situations not being detected and as a result no warning being given when it should be. It is therefore desirable to be able to reliably detect a malfunction of an acceleration sensor.

DE 10 2015 218 941 A1 describes a method for detecting a defect in an acceleration sensor, which is arranged in a rail vehicle and is used to monitor running stability. In the method, the acceleration sensor generates a signal and a test is performed to determine whether a signal-dependent variable satisfies a specified condition with regard to a reference value. The test is used to determine whether the acceleration sensor is defective.

SUMMARY OF THE INVENTION

Against this background, it is the object of the invention to improve the running stability monitoring of a rail vehicle, in particular to increase the reliability in detecting a malfunction of the monitoring system used for running stability monitoring.

This object is achieved by a method according to the invention for detecting a malfunction in a monitoring system, which is used to monitor the running stability of a rail vehicle during operation of the rail vehicle in a monitoring operating range. In the method, an acceleration sensor of the monitoring system generates a signal during operation of the rail vehicle. During a test, a signal-dependent variable is used to test whether the monitoring system has the malfunction. The test is performed during operation of the rail vehicle in an operating range in which the monitoring system does not perform running stability monitoring.

The invention recognized that monitoring systems are often relevant and active only in specified operating ranges. In other words: The monitoring system monitors a running stability of the rail vehicle often exclusively in a monitoring operating range intended for monitoring in which the monitoring system is relevant and active. The core of the invention is to use an operating range to detect an error function of the monitoring system, which is outside the monitoring operating range. For example, in this operating range the running stability monitoring is not used to detect instabilities, but for self-diagnosis.

In this way, the signal generated by the acceleration sensor is plausibility checked during the period when the monitoring system is inactive. This enables signal-based failure detection in dynamic environments, taking into account mechanical constraints.

Conducting the test outside the monitoring operating range has several advantages. Certain malfunctions also or exclusively occur outside the monitoring operating range and can be detected more reliably by the method according to the invention. In addition, performing the test during operation (outside the monitoring operating range) has the further advantage that the complete signal chain can be tested under real ambient conditions over a longer period. These real conditions with a complete signal chain can only be partially simulated on a test stand. Thus, the solution according to the invention can reliably detect recurring defects and random faults.

Preferably, the acceleration sensor measures accelerations on the running gear, in particular the truck, of the rail vehicle in the monitoring operating range. If the accelerations show specified patterns with specified amplitudes, the running behavior is classified as unstable. One response to this is, for example, a reduction in driving speed.

The person skilled in the art will understand the wording "wherein the test is performed during operation of the rail vehicle in an operating range in which the monitoring system does not perform running stability monitoring" preferably to mean that the test is carried out during operation of the rail vehicle outside the monitoring operating range. In other words: The test is performed while the monitoring system is inactive.

The person skilled in the art will understand "detecting a malfunction" to mean, for example, detection of a failure of the monitoring function. The failure can be caused, for example, by a broken wire or a short circuit within the monitoring system, especially within the acceleration sensor.

The person skilled in the art will also understand "detecting a malfunction" to mean the detection of a malfunction of the monitoring system, in particular of the acceleration sensor.

The person skilled in the art will further understand "detecting a malfunction" to mean the failure to detect running instability (i.e. detection of running stability that does not actually exist). This can be caused, for example, by external influences, such as infrastructure, on the vehicle. Infrastructure in this sense means, for example, a worn rail head. Likewise, false detections can be caused by defects in the signal transmission or by random errors in the evaluation. The solution according to the invention is particularly suitable for this type of detection of a malfunction, since the occurrence of a detection of running stability in the operating range that is outside the monitoring operating range is an indication of a malfunction of this type.

A test unit can be used to test whether the signal-dependent variable satisfies the specified condition. For example, software for performing the test can be stored in the test unit. The test unit preferably receives the signal generated by the acceleration sensor and/or the signal-dependent variable indirectly or directly from the acceleration sensor.

The signal-dependent variable can be, among other things, a signal value, i.e. a value of the signal generated by the acceleration sensor. Expediently, the signal is a voltage signal. This means that the variable can be a voltage or a voltage value. Alternatively, the signal is a current signal. The variable can be a current intensity or a current intensity value.

When testing, based on the signal-dependent variable, whether the monitoring system has the malfunction, it is preferably tested whether the signal-dependent variable satisfies a specified condition with respect to a reference value.

It is also advantageous if the signal-dependent variable is a variable calculated by averaging several chronologically consecutive signal values. This means that preferably several chronologically consecutive signal values are averaged before the test is performed.

Averaging allows the signal to be smoothed. Preferably, a time span over which the averaging is performed can be specified. The averaging can, for example, be quadratic averaging. The averaging can also be an arithmetic averaging of the values. In the case of arithmetic averaging of the values, it is expedient to first establish the amount of each signal value and then perform arithmetic averaging of several signal values. Furthermore, the averaging can be a moving averaging, i.e. a moving average can be calculated for each signal value. The reference value can be dependent on the type of average.

Preferably, the signal from the acceleration sensor is filtered using a filter. Furthermore, the test is advantageously performed for the filtered signal. This means that filtering of the signal is preferably performed before the test. Filtering of the signal preferably takes place before averaging of the signal values. By filtering the signal, those frequencies and/or frequency bands in which no mechanical vibrations of the rail vehicles are to be expected, can be attenuated. Furthermore, filtering can attenuate interference frequencies and/or an offset voltage in the signal or filter them out of the signal. Furthermore, signal noise can be reduced by filtering the signal. In this way, an evaluation of the signal and/or a calculation of an acceleration can be facilitated.

Preferably, the filter is a bandpass filter. It is advisable to let the bandpass filter pass the frequency range in which mechanical vibrations of the rail vehicle are to be expected. By means of a bandpass filter, those frequencies and/or frequency bands in which no mechanical vibrations of the object are to be expected can be attenuated or filtered out of the signal. Furthermore, the filter can be a high-pass filter. Expediently, the offset voltage in the signal is attenuated or filtered out of the signal by the high-pass filter. Furthermore, the high-pass filter preferably allows the passing of the frequency in which mechanical vibrations of the rail vehicle are to be expected. Furthermore, the filter may be a low-pass filter. Preferably, the low-pass filter allows passing of the frequency range in which mechanical vibrations of the object are to be expected. Expediently, higher frequencies than the frequencies to be expected of the mechanical vibrations are attenuated or filtered out by the low-pass filter. Furthermore, the signal from the acceleration sensor can be filtered using a filter combination of several different filters.

The above-mentioned reference value is preferably a maximum value of a measuring range of the acceleration sensor.

The maximum value can be understood to be the maximum of the measuring range of the acceleration sensor. Preferably, the test checks whether the quantity, in particular an averaged signal value and/or an averaged acceleration value, exceeds a specified multiple of the reference value. The multiple can be a rational number. Further, the multiple can also be one, i.e. it can be tested whether the quantity exceeds the reference value. If the quantity exceeds the specified multiple of the reference value, then there is usually a malfunction of the acceleration sensor. Expediently, it is interpreted as a malfunction of the acceleration sensor, or a malfunction of the acceleration sensor is detected, if the quantity exceeds the specified multiple of the reference value. Furthermore, the test can be used to check the functionality of a filter, in particular a filter connected downstream of the acceleration sensor. For example, there may be a malfunction of the filter if the quantity exceeds the specified multiple of the reference value.

Based on the detected malfunction, the filter and/or the acceleration sensor can be tested and, if necessary, the defective element can be repaired or replaced. Furthermore, during the test, an auxiliary variable, which is determined independently of the signal from the acceleration sensor, can be used to check whether the signal-dependent variable is plausible. For example, the auxiliary variable can be a state variable that characterizes a state of the object in which the acceleration sensor is located. For example, the auxiliary variable can be a speed of the rail vehicle. Furthermore, the auxiliary variable can be determined, for example, with the aid of a measuring device, in particular with the aid of a speed measuring device. In particular, the test can check whether an acceleration determined from the signal is plausible at a rail vehicle speed determined independently of the acceleration sensor.

The method according to the invention can be used for multi-stage detection. Signal values that are above the detection range (of detectable accelerations) of the acceleration sensor, where neither a short circuit nor a wire break has been detected, indicate a malfunction (for example a defect) in the signal chain or the data processing. In this way, maintenance measures can be planned in a targeted manner. #A2#

According to a preferred embodiment of the method according to the invention, the test is performed during operation of the rail vehicle in the monitoring operating range in which the monitoring system performs the running stability monitoring. The test during operation of the rail vehicle in the operating range in which the monitoring system does not perform running stability monitoring is performed in a complementary manner.

The test during operation of the rail vehicle in the operating range in which the monitoring system does not perform running stability monitoring, accordingly serves as a plausibility check of the detection of the malfunction of the monitoring system. In other words: In accordance with previous solutions, the test to determine whether the monitoring system has the malfunction takes place while the rail vehicle is being operated in the monitoring operating range. According to the embodiment, the testing is additionally (in a complementary manner) performed during operation of the rail vehicle in the operating range in which the monitoring system does not perform running stability monitoring.

When testing whether the signal-dependent variable satisfies a specified condition relating to a reference value, the reference value used in the monitoring operating range may correspond to the reference value used in the operating range in which the monitoring system does not perform running stability monitoring. In other words: For the detection of the malfunction, the known limit values can be used, which are used in the monitoring operating range.

Alternatively or additionally, the reference value can be selected specifically for the detection of malfunctions in the operating range in which the monitoring system does not perform running stability monitoring. For example, the reference value can be chosen smaller because the expected accelerations at lower speeds have smaller absolute values.

#A3#

In a further preferred embodiment of the method according to the invention, the respective operating range, preferably the monitoring operating range, is characterized by a speed of the rail vehicle. The monitoring operating range is present at a speed of the rail vehicle that is above a specified lower speed threshold of the monitoring operating range.

This embodiment is based on the knowledge that a running gear of a rail vehicle has a basic stability: According to this, there is a driving speed (i.e. speed of the rail vehicle) at which the running gear runs stably. The basic stability is characterized, among other things, by a driving speed. The above-mentioned lower speed threshold is preferably in the range of the speed that characterizes the basic stability (hereinafter: basic stability speed).

Depending on the rail vehicle, the lower speed threshold is, for example, in a range of 120 to 160 km/h, for example 140 km/h.

#A4#

According to a preferred development, the operating range in which the monitoring system does not perform running stability monitoring corresponds to a speed range below a specified upper speed threshold.

In this speed range below the specified upper speed threshold, the running stability monitoring is not used to detect instabilities but, for example, for self-diagnosis and consequently to detect a malfunction of the monitoring system.

#A5#

According to a further preferred development, the upper speed threshold is below a basic stability speed that characterizes the basic stability of the rail vehicle. The lower speed threshold of the monitoring operating range is below the basic stability speed. Preferably, the upper speed threshold is below the lower speed threshold of the monitoring operating range.

For example, the upper speed threshold is 90% of the basic stability speed.

In addition, the speed range below the specified upper speed threshold preferably does not extend to standstill, but to a very slow speed, for example 20 km/h.

Expediently, the speed of the object is measured by means of a speed measuring device. Further, it is expedient if the speed measuring device operates independently of the acceleration sensor so that a malfunction of the acceleration sensor is not necessarily accompanied by a malfunction of the speed measuring device.

#A6#

In a preferred embodiment of the method according to the invention, the signal-dependent variable is an acceleration determined on the basis of the signal (or an acceleration value determined on the basis of the signal).

Unlike a method that monitors, for example, a voltage offset of the acceleration sensor, testing the acceleration determined from the signal enables reliable testing. This is because in the event of malfunction of the acceleration sensor, the acceleration sensor may provide a correct offset voltage but an incorrect acceleration value (for example. always zero).

Alternatively, the variable can be another variable derived or determined from the acceleration sensor signal. Logically, the reference value is a value of the same physical quantity.

#A7#

According to another preferred embodiment, the acceleration sensor is a sensor for measuring an acceleration perpendicular to a direction of travel of the rail vehicle. That is, the acceleration may be a transverse acceleration. Expediently, the acceleration sensor measures the actual transverse acceleration of subsystems of the rail vehicle when it is free from malfunctions.

#AB#

According to another preferred embodiment of the method according to the invention, the monitoring system is temporarily deactivated when a malfunction of the monitoring system is detected. In this way, externally induced vibrations caused by the infrastructure, for example, do not lead to permanent restrictions in operation.

The temporary deactivation can be canceled after a specified period. If the malfunction is detected again after cancellation, the monitoring system can be temporarily deactivated again.

#A9#

In another preferred embodiment of the method according to the invention, the monitoring system is no longer used for running stability monitoring if a malfunction of the monitoring system is repeatedly detected. A test by way of a maintenance action then becomes necessary.

In other words: The monitoring system is permanently deactivated and is only used again after a maintenance action has been carried out.

#A10#

According to another preferred embodiment of the method according to the invention, a warning is given when a malfunction of the monitoring system is detected.

The warning can be, for example, an acoustic and/or visual warning. If such a warning is present, the monitoring system can be checked and repaired or replaced if necessary.

#A11#

According to a further preferred embodiment of the method according to the invention, the signal from the acceleration sensor is filtered by means of a frequency filter. The frequency filter is adjusted to frequencies of a signal that the acceleration sensor generates during detection of the malfunction.

Preferably, the frequency filter is adjusted to filter out characteristic frequencies of the signal generated by the acceleration sensor during detection of the malfunction. This embodiment is particularly suitable for detecting a malfunction caused by an external action on the vehicle.

The frequency filter is, for example, the high-pass, low-pass, and/or band-pass filter described above.

#A12#

The invention further relates to a device for detecting a malfunction of a monitoring system used for running stability monitoring of a rail vehicle during operation of the rail vehicle in a monitoring operating range. The device comprises a monitoring system acceleration sensor that is configured to generate a signal during an operation of the rail vehicle. The device further comprises a test facility, which is designed to check whether the monitoring system has the malfunction during a test on the basis of a signal-dependent variable. The test facility is also designed to perform the test during operation of the rail vehicle in an operating range in which the monitoring system does not perform running stability monitoring.

#A13#

The invention further relates to a rail vehicle having a device of the type described above.

#A14#

The invention further relates to a computer program comprising commands which, when the program is executed by the device of the type described above, cause the device to perform the method of the type described above.

#A15#

The invention further relates to a machine-readable storage medium comprising commands which, when executed by a device of the type described above, cause the device to perform the method of the type described above.

For advantages, embodiments and design details of the device according to the invention, the rail vehicle according to the invention, computer program product and machine-readable storage medium, reference can be made to the above description for the corresponding method features.

An exemplary embodiment of the invention will now be explained with reference to the drawings.

DETAILED DESCRIPTION OF THE INVENTION

Figure 1:
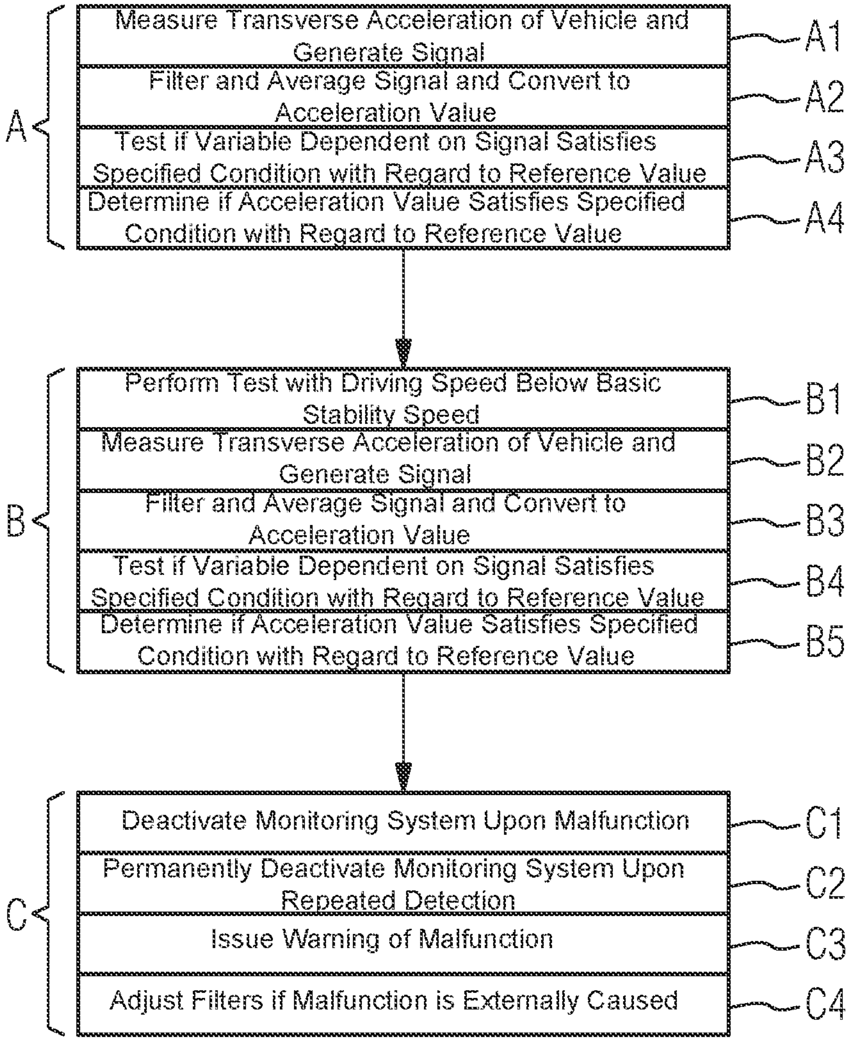
FIG. 1 schematically shows a flowchart of the sequence of an embodiment of a process according to the invention.
Figure 2:
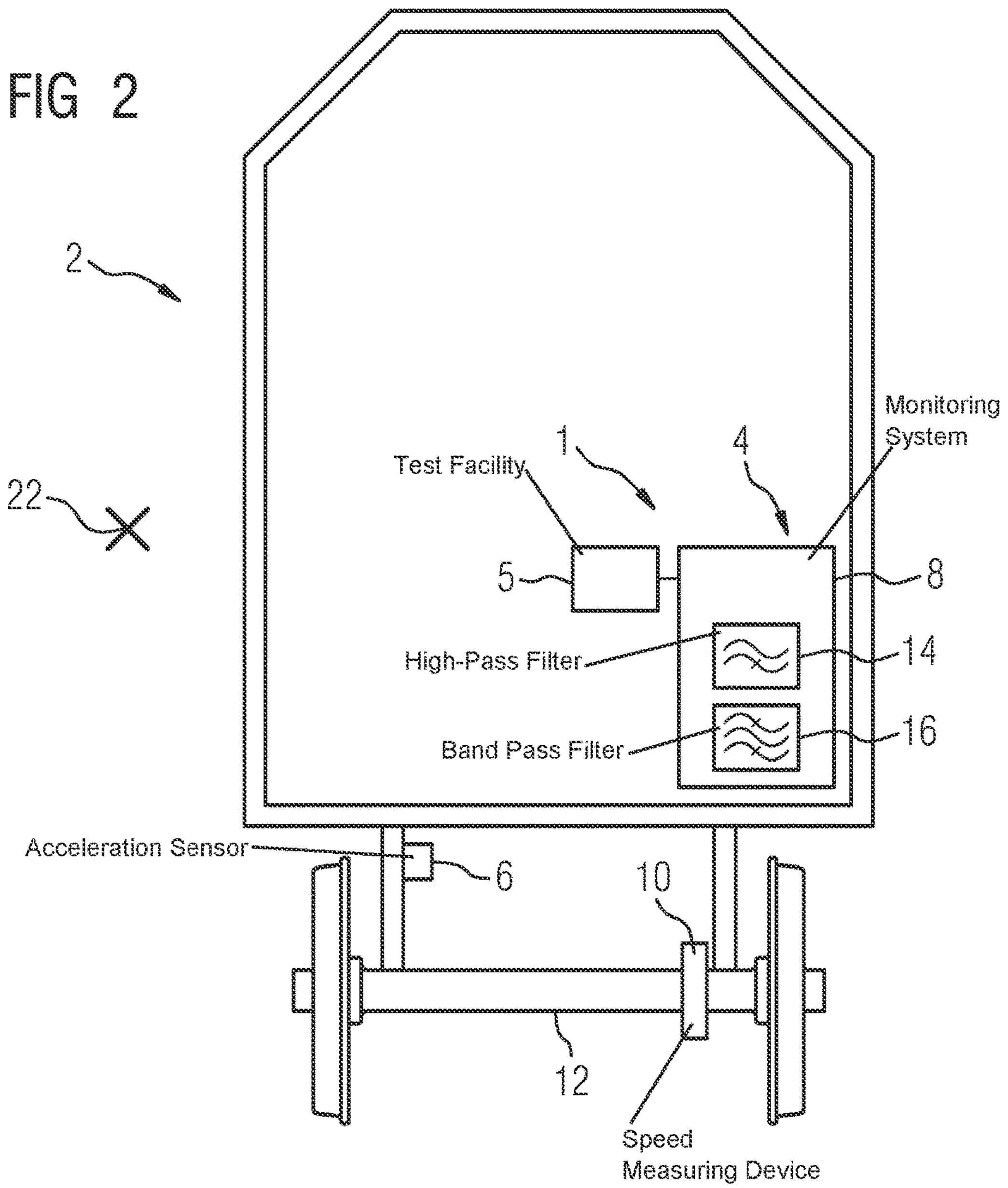
FIG. 2 shows the structure of an exemplary embodiment of a rail vehicle according to the invention and FIG. 3 shows a speed axis with driving speeds.
Figure 3:
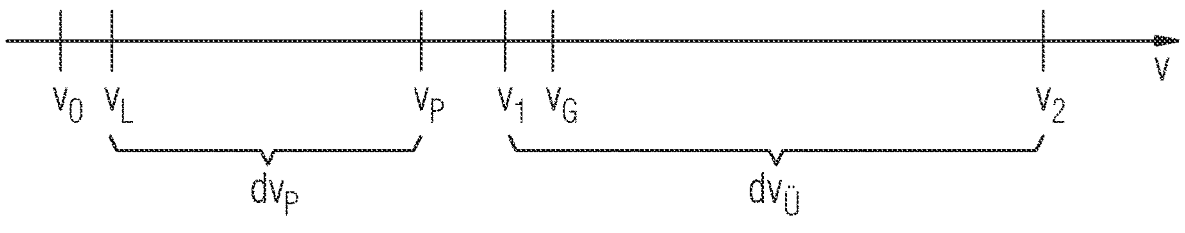

FIG. 1 shows a flowchart, which represents the sequence of the method according to the invention for detecting a malfunction of a monitoring system. FIG. 2 shows a schematic representation of a rail vehicle 2 with a device 1 according to the invention. The speed axis shown in FIG. 3 represents the order of magnitude of the speed variables and intervals described below, although not to scale.

The device 1 comprises a monitoring system 4 and a test facility 5. The monitoring system 4 comprises an acceleration sensor 6 and a monitoring unit 8. The rail vehicle 2 also comprises a speed measuring device 10 for determining a speed v of the rail vehicle 2 (driving speed), with which the rail vehicle 2 moves in a direction of travel 22. The speed measuring device 10 comprises a speed sensor and determines the driving speed v based on a speed of the wheelset axle 12 of the rail vehicle 2. The acceleration sensor 6 and the speed measuring device 10 of the rail vehicle 2 are arranged on the wheelset axle 12 of the rail vehicle 2.

The monitoring unit 8 comprises a high-pass filter 14 and a bandpass filter 16.

The acceleration sensor 6 is a sensor for measuring a transverse acceleration a of the rail vehicle 2. The monitoring unit 8 serves to process the signal generated by the acceleration sensor 6. If the acceleration sensor 6 is fault-free, the acceleration sensor 6 accordingly measures the transverse acceleration of the point of attachment to the rail vehicle 2. This means that the acceleration sensor generates a signal in the form of a voltage, which is dependent on the transverse acceleration a of the rail vehicle 2. A transverse acceleration calculated from the signal accordingly corresponds to the true transverse acceleration, if the monitoring system 4 does not have a malfunction. In the event of a malfunction of the monitoring system 4, however, the transverse acceleration calculated from the signal does not necessarily correspond to the true transverse acceleration of the rail vehicle 2.

The measurement of the transverse acceleration of the rail vehicle 2 serves for running stability monitoring of the rail vehicle 2 by the monitoring system 4.

In a method step A the running stability monitoring is performed by means of the monitoring system 4 during operation of the rail vehicle 2 in a monitoring operating range $dv_{Ü}=(v_1, v_2)$. The monitoring operating range $dv_{Ü}$ is characterized by a driving speed v of the rail vehicle 2. That is to say, if the driving speed v is within the monitoring operating range $dv_{Ü}$ $(v_1<v<v_2)$, a running stability monitoring can usefully be carried out. $V_2$ corresponds to the maximum vehicle speed.

The driving speed $v_G$, which represents the basic stability of the rail vehicle 2 (also referred to in the following as basic stability speed) lies in a lower sub-range of the monitoring operating range $dv_{Ü}$: $v_1<V_G<V_2$.

During the running stability monitoring the acceleration sensor 6 measures in a method step A1 a transverse acceleration of the rail vehicle 2 and in doing so generates a signal.

The signal generated by the acceleration sensor 6 is filtered and averaged in a method step A2 and the individual signal values are in each case converted based on a clear conversion rule into an acceleration value.

The band pass filter 16 is a filter for the frequency range from 3 to 9 Hz. In the frequency range from 3 to 9 Hz mechanical vibrations typically occur due to transverse accelerations a of the rail vehicle 2. Accordingly, band pass filter 16 allows the frequency range from 3 to 9 Hz to pass.

If the acceleration values show a specified pattern with a specified amplitude, then the running behavior is classified as unstable. In response to this, the driving speed v is reduced.

When the running behavior is actually unstable, reducing the driving speed is the correct response. But reducing the driving speed is to be avoided if the acceleration values determined are based on a malfunction of the monitoring system 4. In particular in the event of repeated classification of the running behavior as unstable, the driving speed v is permanently reduced. This leads to operational delays and unnecessary workshop visits, thereby reducing the availability of the rail vehicle 2. It is therefore desirable to increase the reliability of the running stability monitoring.

The device 1 is also configured to detect a malfunction of the monitoring system 4. For example, the test facility 5 is set up to detect a defect in the acceleration sensor 6 or in other parts of the monitoring system 4 or processes that are carried out by the monitoring system 4. These processes can be, for example, the processing and evaluation of signals from the acceleration sensor 6 or of signal-based variables.

The test facility 5 tests in a method step A3, whether a variable dependent upon a signal from the acceleration sensor 6 satisfies a specified condition with regard to a reference value. The signal-dependent variable is the transverse acceleration a described above. Based on the test the test facility 5 determines in a method step A4 whether the acceleration value of the transverse acceleration a satisfies a specified condition with regard to a reference value. This checks whether the monitoring system is malfunctioning.

In a method step B the test is performed during operation of the rail vehicle 2 in an operating range in which the monitoring system 4 does not perform running stability monitoring:

During running of the rail vehicle 2 driving speeds v occur which are below the monitoring operating range $dv_{Ü}=(v_1, v_2)$.

According to the present exemplary embodiment the test is performed in a complementary manner in a method step B1, while the driving speed is below the basic stability speed: $v_P<v_G$. In particular, the test is considered to be outside the monitoring operating range $dv_{Ü}$ if the driving speed $v_P$ is significantly below $v_G$, for example at 90% of $v_G$ ($v_P=0.9*v_G$). Furthermore, the test is performed (outside the monitoring operating range $dv_{Ü}$) at a driving speed v that is significantly above the standstill $v_0=0$: $v_0<v_L$.

In other words: The operating range $dv_{Ü}$ is characterized by a driving speed v of the rail vehicle 2, i.e. if the driving speed v is within the operating range $dv_{Ü}=(v_L, v_P)$, there is an operating range outside the monitoring operating range $dv_{Ü}$ in which the test is carried out in a complementary manner.

In a method step B2 the acceleration sensor 6 measures a transverse acceleration of the rail vehicle 2 and in doing so generates a signal.

The signal generated by the acceleration sensor 6 is filtered and averaged in a method step B3 and the individual signal values are in each case converted based on a clear conversion rule into an acceleration value.

The test facility 5 tests in a method step B4, whether a variable dependent upon a signal from the acceleration sensor 6 satisfies a specified condition with regard to a reference value. The signal-dependent variable is the transverse acceleration a described above. Based on the test the test facility 5 determines in a method step B5 whether the acceleration value of the transverse acceleration a satisfies a specified condition with regard to a reference value. This checks whether the monitoring system 4 is malfunctioning.

In a method step C a response to the detection of a malfunction of the monitoring system 4 is triggered.

For this purpose, the monitoring system 4 is temporarily deactivated in a method step C1, if a malfunction off the monitoring system 4 is detected. Thus, externally induced vibrations do not lead to permanent restrictions. If the malfunction of the monitoring system 4 is repeatedly detected, the monitoring system 4 is permanently deactivated in a method step C2. In this case, a maintenance action is required. The monitoring system 4 is not reactivated until the maintenance task has been completed.

In addition, in a method step C3 a warning can be given if a malfunction of the monitoring system 4 is detected.

The high-pass filter 14 and/or band pass filter 16 can also be adjusted in a method step C4, if a malfunction of the monitoring system 4 is detected which, for example, is caused by an external action on the rail vehicle 2. For example, the high-pass filter 14 and/or band pass filter 16 is adjusted to frequencies of the signal generated by the acceleration sensor 6 while the malfunction is detected. The adjustment is done in such a way that characteristic frequencies of the signal are filtered out.

Although the invention has been illustrated and described in more detail by the preferred exemplary embodiment, the invention shall not be limited by the disclosed examples and other variations may be derived therefrom by the person skilled in the art without extending beyond the scope of protection of the invention.

The invention claimed is:

1. A method for detecting a malfunction in a monitoring system used to monitor running stability of a rail vehicle during operation of the rail vehicle in a monitoring operating range, the method comprising:

using an acceleration sensor of the monitoring system to generate a signal during operation of the rail vehicle;

during a test, using a variable dependent on the signal to test whether the monitoring system has the malfunction; and performing the test during operation of the rail vehicle in an operating range in which the monitoring system is not performing running stability monitoring of the rail vehicle.

2. The method according to claim 1, which further comprises:

performing the test during operation of the rail vehicle in the monitoring operating range in which the monitoring system performs the running stability monitoring; and in a complementary manner, performing the test during operation of the rail vehicle in the operating range in which the monitoring system does not perform the running stability monitoring.

3. The method according to claim 1, which further comprises:

characterizing a respective operating range, or the monitoring operating range, by a speed of the rail vehicle; and providing the monitoring operating range at a speed of the rail vehicle being above a specified lower speed threshold of the monitoring operating range.

4. The method according to claim 3, which further comprises causing the operating range, in which the monitoring system does not perform running stability monitoring, to correspond to a speed range below a specified upper speed threshold.

5. The method according to claim 4, which further comprises:

setting the upper speed threshold to be below a basic stability speed characterizing a basic stability of the rail vehicle; and setting the lower speed threshold of the monitoring operating range to be below the basic stability speed.

6. The method according to claim 1, which further comprises providing the signal-dependent variable as an acceleration determined on a basis of the signal.

7. The method according to claim 1, which further comprises providing the acceleration sensor as a sensor for measuring an acceleration perpendicular to a direction of travel of the rail vehicle.

8. The method according to claim 1, which further comprises temporarily deactivating the monitoring system upon detecting a malfunction of the monitoring system.

9. The method according to claim 1, which further comprises permanently deactivating the monitoring system upon repeatedly detecting a malfunction of the monitoring system.

10. The method according to claim 1, which further comprises issuing a warning upon detecting a malfunction of the monitoring system.

11. The method according to claim 1, which further comprises filtering the signal from the acceleration sensor by using a frequency filter, and adjusting the frequency filter to frequencies of a signal generated by the acceleration sensor during the malfunction.

12. A device for detecting a malfunction in a monitoring system used to monitor running stability of a rail vehicle during operation of the rail vehicle in a monitoring operating range, the device comprising:

an acceleration sensor of the monitoring system configured to generate a signal during the operation of the rail vehicle; and a test facility configured:

to check whether the monitoring system has the malfunction during a test based on a variable dependent on the signal; and to perform the test during the operation of the rail vehicle in an operating range in which the monitoring system is not performing running stability monitoring of the rail vehicle.

13. A rail vehicle, comprising the device according to claim 12.

14. A non-transitory machine-readable storage medium, comprising:

commands stored on the storage medium;

the commands which, upon execution, cause a performance of a method for detecting a malfunction in a monitoring system used to monitor running stability of a rail vehicle during operation of the rail vehicle in a monitoring operating range, the method including:

using an acceleration sensor of the monitoring system to generate a signal during operation of the rail vehicle;

during a test, using a variable dependent on the signal to test whether the monitoring system has the malfunction; and performing the test during operation of the rail vehicle in an operating range in which the monitoring system is not performing running stability monitoring of the rail vehicle.

* * * * *